United States Patent [19]

Yoneyama et al.

[11] Patent Number: 5,428,359
[45] Date of Patent: Jun. 27, 1995

[54] DOPPLER-EFFECT VEHICLE SPEED SENSOR USING DIFFERENT SPEED DETERMINING RULES DEPENDING UPON RECEIVER OUTPUT

[75] Inventors: Masatoshi Yoneyama; Shinji Ikeda, both of Susono; Hiroshi Naganawa, Kagamihara, all of Japan

[73] Assignee: Toyota Jidosha Kabushiki Kaisha, Aichi, Japan

[21] Appl. No.: 136,819

[22] Filed: Oct. 18, 1993

[30] Foreign Application Priority Data

Oct. 20, 1992 [JP] Japan .................. 4-306526
Sep. 16, 1993 [JP] Japan .................. 5-230353

[51] Int. Cl.⁶ ................................. G01S 13/60
[52] U.S. Cl. ......................... 342/70; 367/90
[58] Field of Search ........... 342/70, 71, 72; 367/40

[56] References Cited

U.S. PATENT DOCUMENTS

| | | |
|---|---|---|
| 3,701,568 | 10/1972 | Lewis et al. . |
| 3,918,058 | 11/1975 | Nogori et al. .................. 342/70 |
| 4,125,825 | 11/1978 | Takeuchi et al. . |
| 4,346,774 | 8/1982 | Hirota et al. .................. 342/70 |
| 4,366,546 | 12/1982 | Tachibana et al. . |
| 4,414,548 | 11/1983 | Carpenter et al. .................. 342/71 |
| 4,893,287 | 1/1990 | Stratton et al. . |
| 4,942,558 | 7/1990 | Hiniker et al. .................. 367/91 |
| 4,969,100 | 11/1990 | Takata et al. . |
| 5,016,017 | 5/1991 | Kodera et al. .................. 342/70 X |
| 5,243,564 | 9/1993 | Ikeda et al. . |
| 5,287,329 | 2/1994 | Ikeda .................. 342/70 X |

FOREIGN PATENT DOCUMENTS

| | | |
|---|---|---|
| 0188906 | 7/1986 | European Pat. Off. . |
| 0420313 | 4/1991 | European Pat. Off. . |
| 63-46961 | 2/1988 | Japan . |
| 1-314987 | 12/1989 | Japan . |
| 4-105083 | 4/1992 | Japan . |
| 4-212086 | 8/1992 | Japan . |
| 5-80152 | 4/1993 | Japan . |
| 5-49943 | 7/1993 | Japan . |
| WO89/09416 | 10/1989 | WIPO . |

*Primary Examiner*—Mark Hellner
*Attorney, Agent, or Firm*—Oliff & Berridge

[57] ABSTRACT

A Doppler-effect speed detecting apparatus for detecting a ground speed of a motor vehicle, including a transmitter, a receiver for receiving a portion of a wave transmitted by the transmitter and reflected by a road surface, a circuit for detecting an output level of the receiver, and a ground-speed determining device for determining the vehicle ground speed, on the basis of the frequencies of the transmitted and received waves, according to a predetermined first rule when the output level of said receiver is higher than a predetermined threshold value, and according to a predetermined second rule different from the first rule when the output level is not higher than the threshold value.

23 Claims, 11 Drawing Sheets

FIG. 4

| RAM | 54 |
|---|---|
| ESTIMATED VEHICLE SPEED VSO | 54-1 |
| PROVISIONAL VEHICLE SPEED VPRV | 54-2 |
| OUTPUT RANGE OF RECEIVER 12 | 54-3 |
| COMPENSATING COEFFICIENT KK | 54-4 |
| PRESENT FINAL VEHICLE SPEED VFNL(i) | 54-5 |
| LAST FINAL VEHICLE SPEED VFNL(i-1) | 54-6 |
| CUMULATIVE ERROR ERR | 54-7 |
| COMPENSATING COEFFICIENT K | 54-8 |
| ADJUSTING VALUE $\Delta K$ | 54-9 |
| COUNT CC | 54-10 |

FIG.12

| RAM | 56 |
|---|---|
| ESTIMATED VEHICLE SPEED VSO | 56-1 |
| PROVISIONAL VEHICLE SPEED VPRV | 56-2 |
| PRESENT FINAL VEHICLE SPEED VFNL(n) | 56-3 |
| LAST FINAL VEHICLE SPEED VFNL(n-1) | 56-4 |
| OUTPUT LEVEL L(n) OF RECEIVER 12 | 56-5 |
| ROAD SURFACE CONDITION | 56-6 |
| COMPENSATING COEFFICIENT KK | 56-7 |
| CUMULATIVE ERROR ERR | 56-8 |
| ⋮ | |

DOPPLER-EFFECT VEHICLE SPEED SENSOR USING DIFFERENT SPEED DETERMINING RULES DEPENDING UPON RECEIVER OUTPUT

BACKGROUND OF THE INVENTION

1. Field of the Invention

The present invention relates to a Doppler-effect speed detecting apparatus adapted to detect or determine the ground speed of a motor vehicle, utilizing the Doppler effect of waves.

2. Discussion of the Related Art

In a motor vehicle, the detection or determination of the running speed of the vehicle with high precision is required for achieving adequate control of the vehicle motions in relation to the vehicle running speed, for example, for effecting anti-lock regulation of braking forces of the wheels or traction control of the drive wheels. To this end, it is a conventional practice to estimate the vehicle running speed on the basis of the rotating speeds of the wheels which are detected by respective speed sensors provided for the individual wheels. An anti-lock or traction control of a braking system to regulate the brake forces or drive forces applied to the wheels is implemented in special running conditions of the vehicle in which the slip ratio of the wheels is considerably higher than in an ordinary running condition. In such special running conditions, therefore, the accuracy of estimation of the actual running speed of the vehicle based on the speeds of the wheels is limited.

In light of the drawback encountered in detecting the vehicle running speed using the wheel speed sensors, it has been proposed to provide a motor vehicle with a Doppler-effect vehicle ground-speed detecting apparatus, which is capable of detecting the vehicle running speed with improved accuracy irrespective of an increase in the slip ratios of the wheels. Generally, such a Doppler-effect ground-speed detecting apparatus has (a) a transmitter for transmitting a wave toward the ground or road surface, (b) a receiver for receiving a portion of the transmitted wave which is reflected by the ground surface, and (c) a signal processor or ground-speed determining means for determining the ground speed of the vehicle, according to the Doppler effect or shift, on the basis of the frequencies of the waves as transmitted from the transmitter and as received by the receiver (hereinafter referred to as "transmitted and received waves").

However, the Doppler-effect ground-speed detecting technique suffers from inherent drawbacks not encountered in the prior art which utilizes the wheel speed sensors to estimate the ground speed of the vehicle. That is, since a Doppler-effect ground-speed detecting apparatus utilizes a wave that is irregularly reflected by the road surface, the detecting accuracy of this apparatus is affected by the road surface condition, more precisely, the wave reflecting condition of the road surface. Described in detail, the component of the transmitted wave to be irregularly reflected by the road surface is reduced with a result of lowering the output level of the receiver, when the road surface on which the vehicle is running has a relatively high degree of smoothness, for instance, when the road surface is covered with water or ice. The lowering of the output level of the receiver leads to undesirable reduction in the accuracy of detection of the ground speed of the vehicle.

To assure high accuracy of detection of the vehicle ground speed even when the output level of the receiver is comparatively low, one of the assignees of the present application proposed a Doppler-effect ground-speed detecting apparatus as disclosed in JP-A-4-212086. This apparatus includes (a) vehicle speed estimating means for obtaining an estimated vehicle speed on the basis of the speeds of the vehicle wheels, (b) receiver-output detecting means for detecting the output level of the receiver of the Doppler-effect speed sensor, and (c) ground-speed determining means for determining the vehicle ground speed on the basis of the frequencies of the transmitted and received waves when the output level of the receiver detected by the receiver-output detecting means is higher than a predetermined threshold value, and determining as the vehicle ground speed the estimated vehicle speed obtained by the vehicle speed estimating means when the detected output level of the receiver is not higher than the threshold value.

The inventors of the present invention have continued efforts to pursue techniques for detecting the ground speed of a motor vehicle with sufficiently high accuracy even when the output level of the receiver is comparatively low. As a result, the present inventors have recognized a fact that there exists a given correlation between the actual vehicle ground speed, and the original vehicle ground speed as determined by the ground-speed determining means on the basis of the frequencies of the transmitted and received waves (hereinafter referred to as "originally determined vehicle ground speed"), irrespective of the output level of the receiver as compared with a predetermined threshold. Described more specifically, the originally determined vehicle ground speed is lower than the actual vehicle ground speed when the output level of the receiver is relatively low, in the case where the transmitter and receiver are attached to the vehicle body such that the boresights or optical axes of the transmitter and receiver are inclined in the backward or reverse running direction of the vehicle. The amount of decrease of the originally determined vehicle ground speed with respect to the actual vehicle ground speed increases with an increase in the actual ground speed. In the case where the boresights of the transmitter and receiver are inclined in the forward running direction of the vehicle, the originally determined vehicle ground speed is higher than the actual vehicle ground speed when the output level is relatively low. The amount of increase of the originally determined vehicle ground speed with respect to the actual vehicle ground speed increases with an increase in the actual ground speed. In view of this fact, it was found that the originally determined vehicle ground speed could be effectively utilized, rather than ignored in the prior art, to determine the actual vehicle ground speed with high accuracy even when the output level of the receiver is relatively low due to insufficient irregular reflection of the transmitted wave from the road surface under certain conditions of the road surface.

SUMMARY OF THE INVENTION

It is therefore an object of the present invention to provide a Doppler-effect speed detecting apparatus which effectively utilizes the originally determined vehicle ground speed either directly or indirectly when the output level of the receiver is relatively low, to thereby minimize the lowering of the accuracy of detection of the vehicle ground speed when the receiver output level is low.

The above object may be accomplished according to the principle of the present invention, which provides a Doppler-effect speed detecting apparatus for detecting a ground speed of a motor vehicle, comprising: (a) a transmitter for transmitting a wave toward a road surface; (b) a receiver for receiving a portion of the transmitted wave which is reflected by the road surface; (c) receiver-output detecting means for detecting an output level of the receiver; and (d) ground-speed determining means for determining the ground speed of the vehicle owing to a Doppler effect, on the basis of a frequency of the transmitted wave and a frequency of the reflected portion of the transmitted wave, according to a predetermined first rule when the output level of the receiver is higher than a predetermined threshold value, and according to a predetermined second rule different from the first rule when the output level is not higher than the threshold value.

The ground-speed determining means may be arranged to first calculate the vehicle ground speed on the basis of the frequencies of the transmitted and reflected waves and according to the predetermined first rule, irrespective of the output level of the receiver as compared with the threshold value, and determine the calculated ground speed as the vehicle ground speed when the receiver output level is higher than the threshold value, or compensate the calculated ground speed according to the second rule to thereby obtain a compensated vehicle speed as the ground speed when the receiver output level is not higher than the threshold value. This arrangement is an example of the type which directly utilizes the originally determined vehicle ground speed.

In the above form of the invention, it is possible to obtain the compensated vehicle speed according to the following equation as the predetermined second rule, which is based on the above-indicated fact that the amount of difference or deviation of the originally determined vehicle ground speed from the actual vehicle ground speed varies with the actual running speed of the vehicle.

$Vcom = Vprv + KK \cdot Va$ where, $Vcom$ = compensated vehicle speed;
 $Vprv$ = originally determined ground speed;
 $Va$ = parameter approximating the actual vehicle speed.

In the above equation, the parameter $Va$ may be any suitable variable which reflects or approximates the actual ground speed of the vehicle, such as the originally determined ground speed per se, or the estimated vehicle speed as obtained on the basis of the speeds of the vehicle wheels as described above.

In an alternative form of the invention, the compensated vehicle speed when the output level of the receiver is not higher than the threshold value may be obtained by first suitably compensating or adjusting a parameter or parameters influencing the determination of the actual ground speed, for example, at least one of the frequencies of the transmitted and received waves and the angle of inclination of the transmitter and receiver, and then calculating the compensated vehicle speed according to the compensated parameter or parameters. The compensation of the parameter or parameters corresponds to the predetermined second rule. This arrangement is an example of the type which indirectly utilizes the originally determined vehicle ground speed.

In the Doppler-effect speed detecting apparatus of the present invention constructed as described above, the output level of the receiver is detected by the receiver-output detecting means, and the vehicle ground speed is determined on the basis of the frequencies of the transmitted and received waves, according to the first rule when the receiver output level is higher than the threshold value, and according to the second rule when the receiver output level is equal to or lower than the threshold value. The first rule is formulated on an assumption that the output level of the receiver is not insufficient due to the road surface condition, while the second rule is formulated on an assumption that the receiver output level is insufficient due to the road surface condition to such an extent that the ground speed as determined on the basis of the frequencies of the transmitted and reflected waves should be compensated to determine the actual ground speed.

It will be understood from the above description that the Doppler-effect speed detecting apparatus according to the present invention utilizes the originally determined vehicle ground speed directly or indirectly to determine the vehicle ground speed with a minimum of lowering of the detecting accuracy when the output level of the receiver is relatively low.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 4 is a view indicating memory areas in a random-access memory of the computer;

FIG. 12 is a view indicating memory areas of a random-access memory of the computer of the controller of FIG. 10.

DETAILED DESCRIPTION OF THE PREFERRED EMBODIMENTS

Figure 1:
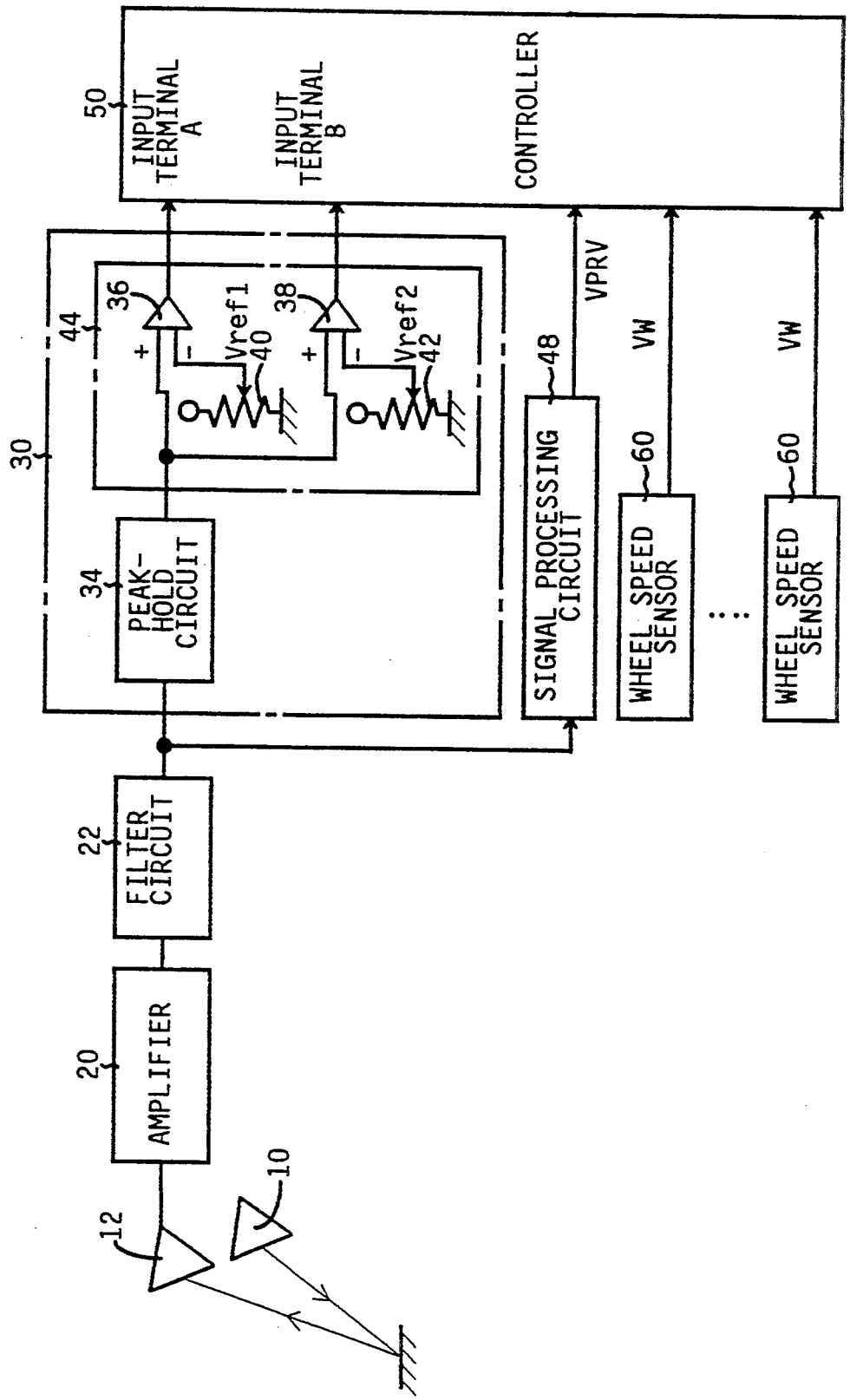
FIG. 1 is a schematic block diagram illustrating a Doppler-effect vehicle-speed detecting apparatus constructed according to one embodiment of this invention.

Referring first to the schematic block diagram of FIG. 1, there is shown one embodiment of the Doppler-effect vehicle-speed detecting apparatus of the present invention, which is constructed to detect or determine the ground speed of a motor vehicle relative to the ground or road surface on which the vehicle is running. The apparatus includes a transmitter 10 and a receiver 12, which are attached to the underside of the vehicle body such that the boresights or axes of the transmitter and receiver 10, 12 are inclined in a backward running direction of the vehicle, at a predetermined angle $\theta$ (e.g., 45°) relative to the ground or road surface.

The transmitter 10 includes a piezoelectric element for converting an electric signal received from a suitable oscillator, into a wave in the form of a ultrasonic wave, which is transmitted toward the road surface. The receiver 12, on the other hand, receives a portion of the ultrasonic wave which is transmitted from the transmitter 10 and irregularly reflected by the road surface. The receiver 12 includes a piezoelectric element for converting the received ultrasonic wave into an electric signal. The receiver 12 is connected to an amplifier 20 and a filter circuit 22, so that the electric signal generated by the receiver 12 is first amplified by the amplifier 20 and then filtered by the filter circuit 22 to eliminate noises included therein.

The filter circuit 22 is connected to a receiver-output detecting circuit 30 for detecting the output level of the receiver 12. The detecting circuit incorporates a peak-hold circuit 34, and a discriminating circuit 44 including two comparators 36, 38 and two variable resistors 40, 42.

The peak-hold circuit 34 detects and holds a peak level of the electric signal received from the filter circuit 22, namely, a peak value of the periodically changing level of the output voltage signal of the receiver 12. The output of the peak-hold circuit 34 is connected to a positive input of the comparator 36 and a positive input of the comparator 38.

The variable resistors 40, 42 are connected to negative inputs of the comparators 36, 38, respectively, so that a first reference voltage Vref1 and a second reference voltage Vref2 are applied to the respective comparators 36, 38. The second reference voltage Vref2 is lower than the first reference voltage Vref1. The comparator 36 produces a high-level output signal when the voltage level at the positive input is higher than the reference first reference voltage ref1, and a low-level output signal when the voltage level at the positive input is equal to or lower than the first reference voltage Vref1. Similarly, the comparator 38 produces a high-level and a low-level output signal, as a result of comparison of the positive input voltage with the second reference voltage Vref2.

The receiver-output detecting circuit 30 is therefore capable of determining the level of the output voltage signal of the receiver 12 on the basis of the voltage levels of the output signals of the two comparators 36, 38, more particularly, determining whether the output level of the receiver 12 is relatively high, medium or relatively low. Described in detail, the high-level output signal of the comparator 36 indicates that the output level of the receiver 12 is in a high range, while the low-level output signal of the comparator 38 indicates that the output level of the receiver 12 is in a low range. Further, the low-level output level of the comparator 36 and the high-level output level of the comparator 38 indicate that the output level of the receiver 12 is in a medium range.

To the filter circuit 22, there is also connected a signal processing circuit 48, which is adapted to calculate a provisional vehicle speed VPRV (original vehicle speed indicated above) on the basis of the electric signal received from the filter circuit 22, and a signal (not shown) indicative of the frequency of the ultrasonic wave generated by the transmitter 10, according to the principle of the Doppler effect well known in the art.

The receiver-output detecting circuit 30 and the signal processing circuit 48 are connected to inputs of a controller 50. The output of the comparator 36 is connected to an input terminal A of the controller 50, while the output of the comparator 38 is connected to an input terminal B of the controller 50. The controller 50 also receives output signals of four wheel speed sensors 60 representative of the rotating speeds of respective four wheels of the vehicle, that is, front left and right wheels, and rear left and right wheels.

The controller 50 is constituted principally by a computer incorporating a central processing unit (CPU), a read-only memory (ROM), and a random-access memory (RAM). The ROM stores programs for executing a routine for calculating an estimated vehicle speed VSO, a routine for compensating the provisional vehicle speed VPRV as illustrated in the flow chart of FIG. 2, and a routine for calculating a final vehicle speed VFNL. These routines will be described below.

The RAM of the computer of the controller 50 is generally indicated at 52 in FIG. 4. The RAM has various memory areas including: a memory area 54-1 for storing data indicative of the estimated vehicle speed VSO; a memory area 54-2 for storing data indicative of the provisional vehicle speed VPRV calculated by the signal processing circuit 48; a memory area 54-3 for storing data indicative of the range of the output level of the receiver 12; a memory area 54-4 for storing data indicative of a compensating coefficient KK; a memory area 54-5 for storing data indicative of a present final vehicle speed VFNL(i); a memory area 54-6 for storing data indicative of a last final vehicle speed VFNL(i−1); a memory area 54-7 for storing data indicative of a cumulative error ERR; a memory area 54-8 for storing data indicative of a compensating coefficient K; a memory area 54-9 for storing data indicative of an adjusting value $\Delta K$; and a memory area 54-10 for storing data indicative of a count CC which is incremented at a time interval $\alpha$ which will be described.

The routine for calculating the estimated vehicle speed VSO is effected to calculate the present estimated vehicle speed VSO(i) on the basis of the speeds VW of the front left and right and rear left and right wheels as detected by the respective wheel speed sensors 60. More specifically, the routine is adapted to first obtain the following three wheel speed values: (1) a highest one of the currently detected speeds VW of the four wheels; (2) a maximum wheel speed calculated on the basis of the last estimated vehicle speed VSO(i−1); and (3) a minimum wheel speed calculated on the basis of the last estimated vehicle speed VSO(i−1). The calculation of the maximum and minimum speeds will be described. Then, an intermediate value of the above three values is determined as the present estimated vehicle speed VSO(i).

The maximum wheel speed indicated at (2) above is calculated as VSO(i−1)+GACC·α, while the minimum wheel speed indicated at (3) above is calculated as VSO(i−1)−GDEC·α. GACC and GDEC represent upper limits (predetermined constants) of acceleration and deceleration of the vehicle, respectively, while α represents a sampling interval of the estimated vehicle speed VSO(i), that is, the cycle time of the final vehicle speed calculating routine of FIG. 3.

The estimated vehicle speed VSO(i) thus calculated is stored in the memory area 54-1 of the RAM 54.

Figure 3:
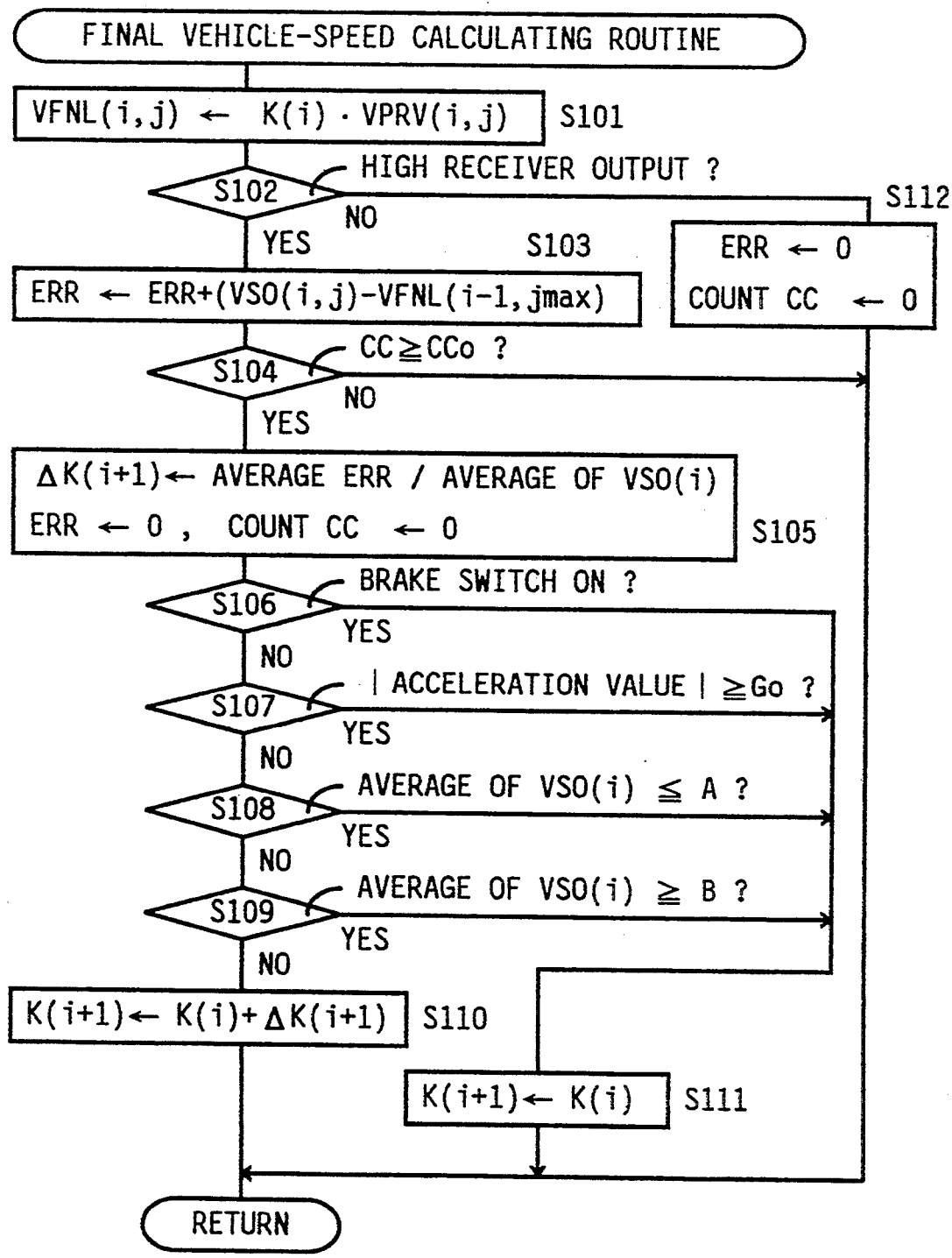
FIG. 3 is a flow chart illustrating a final vehicle speed calculating routine also executed by the computer.
Figure 5:
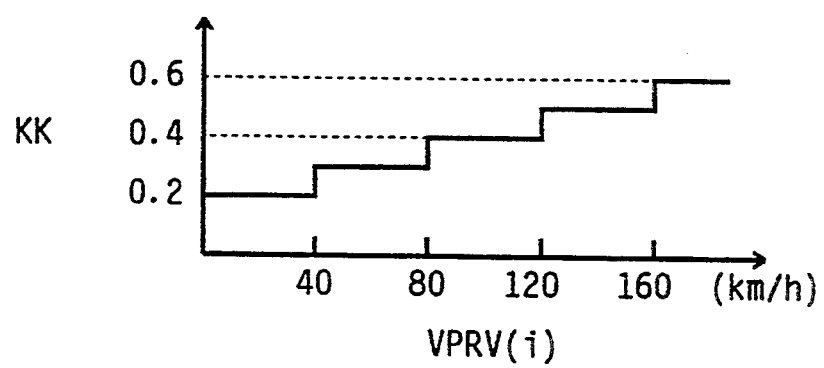
FIG. 5 is a graph indicating a relationship between a provisional vehicle speed PRV(i) and a compensating coefficient KK, which relationship is used in the provisional vehicle speed compensating routine of Fig. 2.

Briefly, the provisional vehicle speed compensating routine is effected to process the provisional vehicle speed VPRV in three different ways, depending upon the determination based on the output levels of the two comparators 36, 38. In the case of the determination that the output level of the receiver 12 is in the high range, the present provisional vehicle speed VPRV (i) as currently calculated by the signal processing circuit 48 is stored in the memory area 54-2 of the RAM 54. In this case, the output VPRV (i) of the circuit 48 is not compensated. In the case of the determination that the output level of the receiver 12 is in the low range, the output VPRV of the circuit 48 is ignored, since the output level lower than the second reference voltage Vref2 indicates a relatively high possibility of any defect of the receiver 12. In this case, the last final vehicle speed VFNL(i−1) which will be described by reference to the flow chart of FIG. 3 is read out from the memory area 54-6 of the RAM 54 and stored in the memory area 54-2 as the present provisional vehicle speed VPRV(i). In the case of the determination that the output level of the receiver 12 is in the medium range, it is considered that the road surface is too smooth to irregularly reflect the ultrasonic wave toward the receiver 12, and the output VPRV(i) of the signal processing circuit 48 needs suitable compensation. In this embodiment, the output VPRV(i) as produced by the circuit 48 is compensated to obtain a compensated vehicle speed Vcom according to an equation VPRV(i)+KK·VPRV(i), wherein KK represents a compensating coefficient (0 through 1) which is determined by the present provisional vehicle speed VPRV(i), and according to a predetermined relationship between KK and VPRV(i), such that the compensating coefficient KK increases with the provisional vehicle speed VPRV(i), as indicated in FIG. 5, by way of example. In this respect, it is noted that the provisional vehicle speed VPRV(i) which is multiplied by the compensating coefficient KK is considered to be a parameter which reflects or approximates the actual vehicle speed. The data representative of this relationship are stored in the ROM of the computer of the controller 50.

Referring to the flow chart of FIG. 2, the provisional vehicle speed compensating routine will be described in detail.

This routine is effected with a predetermined cycle time. Each cycle of execution of the routine is started with step S1 to determine whether the output level of the comparator 36 received by the input terminal A of the controller 50 is high or not. If the output level of the comparator 36 is high, an affirmative decision (YES) is obtained in step S1, and the control flow goes to step S10 in which the controller 50 determines that the output level of the receiver 12 is in the high range. Then, the control goes to step S11 to receive the present provisional vehicle speed VPRV(i) from the signal processing circuit 48, and to step S12 in which the received present provisional vehicle speed VPRV(i) is stored in the memory area 54-2 of the RAM 54. The control then returns to step S1 to execute the next cycle.

If the output level at the input terminal A is low, on the other hand, a negative decision (NO) is obtained in step S1, and the control flow goes to step S2 to determine whether the output level of the comparator 38 received by the input terminal B is high or not. If the output level of the comparator 38 is low, a negative decision (NO) is obtained in step S2, and step S3 is implemented to determine that the output level of the receiver 13 is in the low range. The control then goes to step S4 to read the last final vehicle speed VFNL(i−1) stored in the memory area 54-6 of the RAM 54, and to step S5 in which the last final vehicle speed VFNL(i−1) is stored as the present provisional vehicle speed VPRV(i) in the memory area 54-2 of the RAM 54. The control then returns to step S1.

If the output level at the input terminal A is low while the output level at the input terminal B is high, a negative decision and an affirmative decision (YES) are obtained in steps S1 and S2, respectively, whereby the control flow goes to step S6 in which the controller 50 determines that the output level of the receiver 12 is in the medium range. In this case, the control flow goes to step S7 to receive the present provisional vehicle speed VPRV(i) from the signal processing circuit 48, and to step S8 to determine the compensating coefficient KK, on the basis of the present provisional vehicle speed VPRV(i) and according to the predetermined VPRV(i)-KK relationship stored in the ROM of the controller 50, which is illustrated in FIG. 5 for illustrative purpose only. Step S8 is followed by step S9 in which the present provisional vehicle speed VPRV(i) is compensated according the equation VPRV(i)+KK·VPRV(i). That is, the compensated provisional vehicle speed Vcom is a sum of the currently obtained provisional vehicle speed VPRV(i) and a value KK·VPRV(i), the latter value being an amount of compensation determined by the compensating coefficient KK which in turn is determined by the present provisional vehicle speed VPRV(i).

Referring next to the flow chart of FIG. 3, there will be described the final vehicle speed calculating routine. This routine is one of the subject matters of co-pending application Ser. No. 08/070,104 assigned to one of the assignees of the present application.

Initially, there will be described the routine in the case where the output level of the receiver 12 is in the high range, namely, when the affirmative decision (YES) is obtained in step S102.

Briefly explained, the present routine is adapted so that the final vehicle speed VFNL when the vehicle is in a steady running state is determined by compensating the provisional vehicle speed VPRV (as stored in the memory area 54-2 in step S12) on the basis of a relationship between VSO and VPRV in the steady running state, and the final vehicle speed VFNL when the vehicle is in a transient running state is determined by compensating the provisional vehicle speed VPRV on the basis of a relationship between VSO and VPRV which was obtained in the preceding steady running state. The steady running state is defined as a state in which the estimated vehicle speed VSO obtained from the wheel speeds VW represents the actual ground speed of the vehicle with sufficiently high accuracy, with the vehicle running at a comparatively constant speed. On the other hand, the transient running state is defined as a state in which the estimated vehicle speed VSO considerably deviates from the actual vehicle ground speed, with the vehicle speed changing at a comparatively high rate.

Described in detail, each time the routine is executed, the provisional vehicle speed VPRV(i) is read out from the memory area 54-2 of the RAM 54, and the final value VFNL(i) of the vehicle speed (ground speed) is calculated by multiplying the provisional vehicle speed VPRV(i) by the currently effective compensating coefficient K(i). The compensating coefficient K(i) is determined differently in the steady and transient running states of the vehicle. In the steady running state, an adjusting value ΔK for updating the compensating coefficient K(i) or obtaining the compensating coefficient K(i+1) used in the next cycle is calculated by first calculating a difference VSO(i)−VFNL(i−1) and then dividing the difference by VSO(i). The difference is calculated by subtracting the last final vehicle speed VFNL(i−1) stored in the memory area 54-6 from the present estimated vehicle speed VSO(i) stored in the memory area 54-1. The compensating coefficient K(i+1) used in the next cycle is determined by adding the calculated adjusting value AK to the present compensating value K(i). In the transient running state of the vehicle, the final value of the compensating coefficient K at the end of the period of the last steady running state of the vehicle is used as the next compensating coefficient K(i+1).

The principle of calculating the final vehicle speed VFNL will be described in detail.

The present embodiment is based on a fact that the final vehicle speed VFNL (i.e., actual running speed of the vehicle relative to the ground surface) is proportional to the provisional vehicle speed VPRV, that is, a fact that an equation VFNL =K·VPRV is satisfied.

The following equations corresponding to respective cycles of execution of the routine of FIG. 3 are obtained from the above equation VFNL=K-VPRV:

$$VNFL(i) = K(i) \cdot VPRV(i)$$
$$VNFL(i-1) = K(i-1) \cdot VPRV(i-1)$$
$$\vdots$$
$$VNFL(i) = K(1) \cdot VPRV(1)$$

In the present embodiment, the compensating coefficient K(i) used in the above equations is updated according to the following equation which uses the adjusting value ΔK)(i):

$$K(i) = K(i-1) + \Delta K(i)$$

Although the adjusting value ΔK(i) for obtaining he updated or present compensating coefficient K(i) may be a predetermined constant which is a small value, the present embodiment is adapted to obtain the adjusting value ΔK(i) according to the following equation:

$$\Delta K(i) = [VSO(i) - VFNL(i-1)]/VSO(i)$$

The final vehicle speed calculating routine of FIG. 3 is formulated according to the principle described above so that the compensating coefficient K for calculating the final vehicle speed VFNL from the provisional vehicle speed VPRV is updated only when the vehicle is running in the steady state, and is fixed at the last value at the end of the period of the last steady running state of the vehicle when the vehicle is in the transient state.

Figure 6:
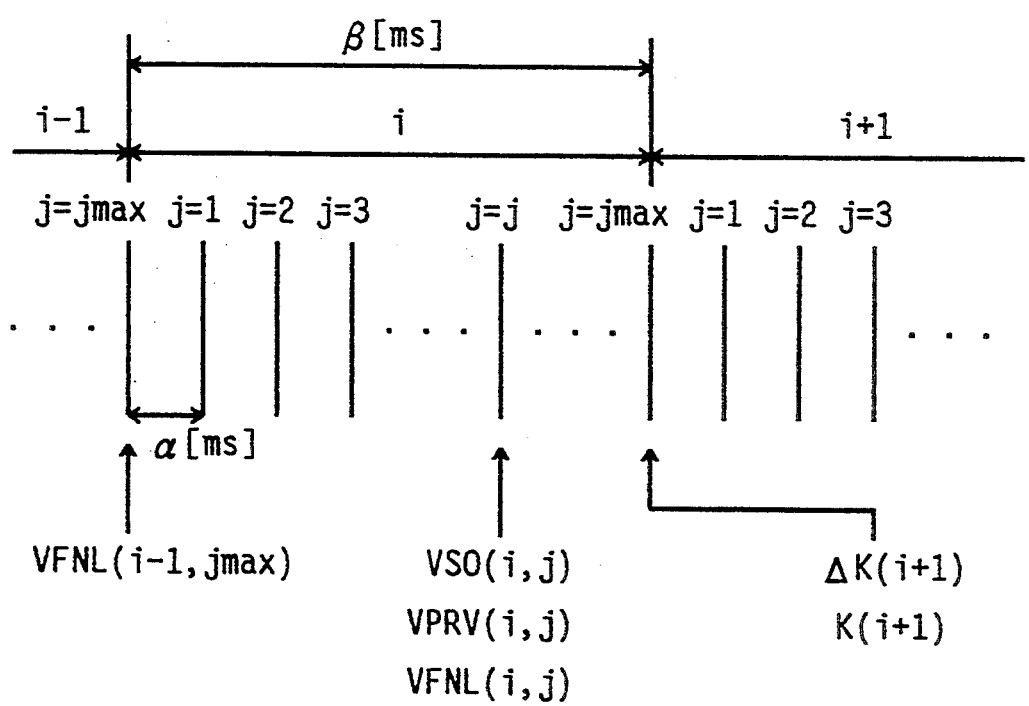
FIG. 6 is an illustration showing the cycle time $\alpha$ of the vehicle speed calculating routine of FIG. 3, and the time interval $\beta$ for updating the adjusting value $\Delta K$.

The present routine of FIG. 3 is executed with the cycle time α(ms), to update or calculate the estimated vehicle speed VSO, provisional vehicle speed VPRV and final vehicle speed VFNL at the time interval α, as indicated in FIG. 6. However, the compensating coefficient K is updated at a time interval β (ms) longer than the cycle time α of the routine of FIG. 3, as also indicated in FIG. 6. Therefore, the compensating coefficient K(i) remains constant for the time duration β during which the speed values VSO, VPRV and VFNL are obtained at the shorter time interval α (at which a value "j" is incremented). Thus, successive final vehicle speed values VFNL are obtained on the basis of the updated provisional vehicle speed values VPRV and the same compensating coefficient K during each time period β.

Described more particularly, a cumulative error ERR is calculated at the time interval β. The cumulative error ERR is a sum of differences VSO(i,J)−VFNL(i−1, jmax) which are obtained at the time interval α during each time period β. The value VSO(i,j) is a value obtained at the time interval α, while the value VFNL(i−1, Jmax) is the final vehicle speed value VFNL which was obtained last at the end of the preceding time period β, as the n-th value VFNL, where n=jmax (number of cycles implemented to obtain VFNL in each time period β). The cumulative error ERR is stored in the memory area 54-7 of the RAM 54, and an average of the cumulative error ERR is obtained as ERR/jmax, at the end of each time period β, so that the adjusting value ΔK(i+1) is calculated by dividing the average cumulative error ERR by an average of the estimated vehicle speed values VSO obtained in each time period β.

In the present embodiment, the steady running state of the vehicle is detected if the following three conditions are satisfied:
1) The brake pedal is not depressed (with brake switch being off);
2) The vehicle is not accelerated or decelerated at a rate exceeding an upper limit;
3) The average estimated vehicle speed VSO(i) lies within a predetermined range.

The non-operated state of the brake pedal is detected by an output signal of a brake switch which is turned on when the brake pedal is depressed. The acceleration or deceleration value of the vehicle is obtained as a difference between the successive two values of the estimated vehicle speed VSO. The acceleration or deceleration value is not excessive if the absolute value of the above difference is smaller than a predetermined threshold $G_0$. The predetermined range of the average estimated vehicle speed VSO(i) is defined by a lower limit A (e.g., 40 km/h) and an upper limit B (e.g., 70 km/h).

In the present embodiment, the adjusting value ΔK is obtained at the time interval β, irrespective of whether the vehicle is in the steady running state or the transient running state. In the steady running state, the obtained adjusting value ΔK(i+1) is added to the present adjusting value ΔK(i) to determine the next compensating coefficient K(i+1). In the transient running state (when any one of the above three conditions is not satisfied), the next adjusting value $\Delta K(i+1)$ is set to zero, that is, the present compensating coefficient $K(i)$ is used as the next compensating coefficient $K(i+1)$. The updated compensating value $K(i)$ and the updated adjusting value $\Delta K(i)$ are stored in the memory areas 54-8 and 54-9 of the RAM 54, respectively.

In the present embodiment, the last value of the compensating coefficient K used in a steady running period of the vehicle is used as the initial value of the compensating coefficient K in the next steady running period which follows a transient running period between the two steady running periods. Thus, the compensating coefficient K is not reset to "1" at the beginning of each steady running period the vehicle of.

The value "i" used in the routine of FIG. 3 is incremented each time the output level of the receiver 12 is changed from the low or medium range to the high range, and also each time the time period $\beta$ (ms) has passed while the output level of the receiver 12 is in the high range. The value "j" is incremented each time the time period $\alpha$ (ms) has passed, and is reset to "1" when the value "i" is incremented.

The above explanation refers to the manner of determining the compensating coefficient K used to determine the final vehicle speed VFNL when the output level of the receiver 12 is in the high range. When the receiver output level is in the medium or low range (hereinafter referred to as "non-high range"), the normal control adapted to update the compensating coefficient K as described above is inhibited until the receiver output level rises to fall in the high range. During this period, a special control is effected to fix the compensating coefficient K at the last value used in the preceding normal control period, and the final vehicle speed values VFNL(i) are determined on the basis of the provisional vehicle speed values VPRV(i) updated at the time interval $\alpha$ and the fixed or constant compensating coefficient K.

It is noted that the value "i" is also incremented each time the output level of the receiver 12 is changed from the high range to the non-high range.

Referring to the flow chart of FIG. 3, the final vehicle speed calculating routine will be described in detail.

When the computer of the controller 50 is turned on, the compensating coefficient K stored in the memory area 54-8 of the RAM 54 is reset to the initial value "1", and the cumulative error ERR and the last final vehicle speed VFNL(i-1) which are stored in the respective memory areas 54-7 and 54-6 are reset to the initial value "0". Then, the routine of FIG. 3 is executed with the cycle time $\alpha$ (ms).

Initially step S101 is implemented to read out the compensating coefficient K (initially reset to "1") from the memory area 54-8, as the presently effective compensating coefficient $K(i)$. Further, the provisional vehicle speed VPRV is read out from the memory area 54-2, as the presently effective provisional vehicle speed VPRV(i,j), e.g., VPRV(1,1) in the first cycle of execution of the routine. Then, the final vehicle speed VFNL(i,j), e.g., VFNL(1,1) in the first cycle is calculated by multiplying the provisional vehicle speed VPRV(i,j) by the compensating coefficient $K(i)$. The calculated final vehicle speed VFNL(i,j) is stored in the memory area 54-5 as the present final vehicle speed VFNL(i).

Figure 2:
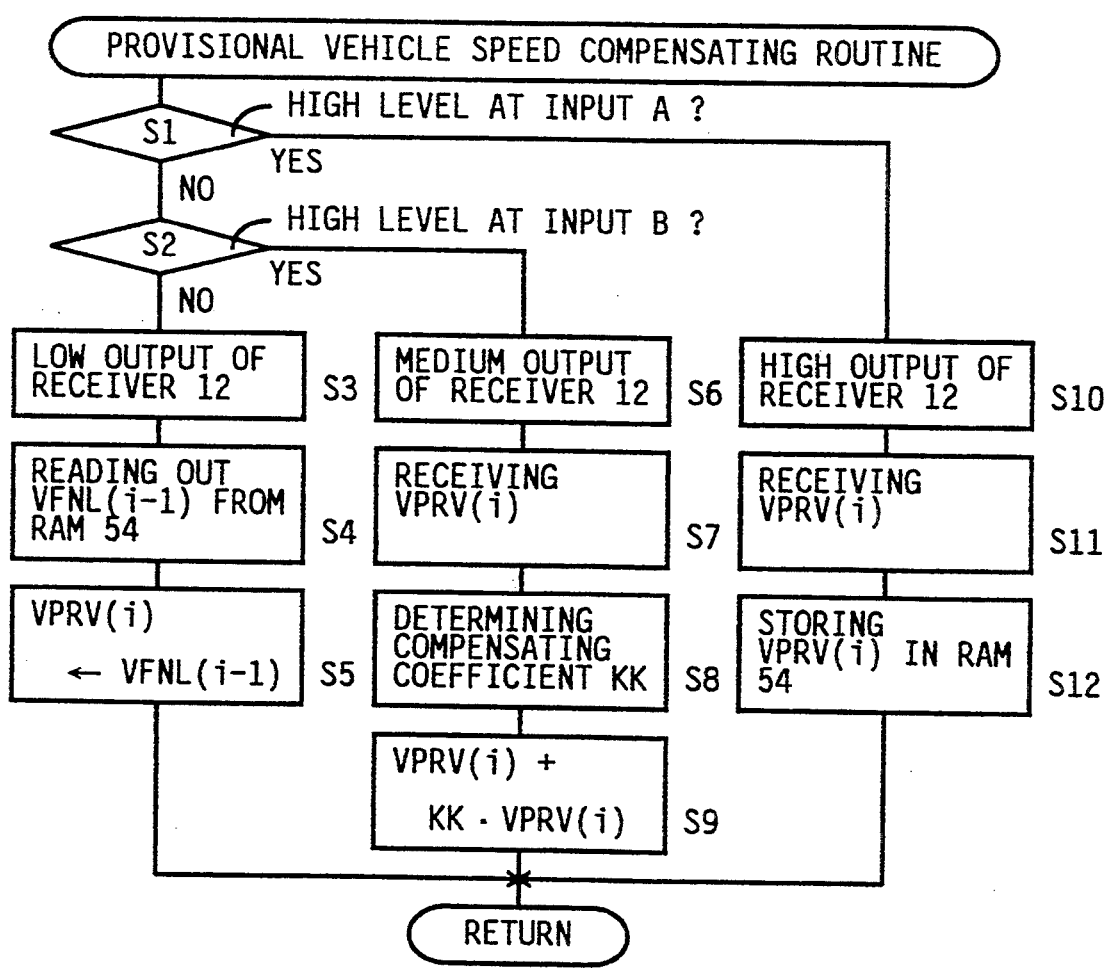
FIG. 2 is a flow chart illustrating a provisional vehicle speed compensating routine executed by a computer of a controller shown in FIG. 1.

The control flow then goes to step S102 to determine whether the range of the output level of the receiver 12 determined in the provisional vehicle speed compensating routine of FIG. 2 is the high range or not. If the output level of the receiver 12 is in the high range, an affirmative decision (YES) is obtained in step S102, and the control flow goes to step S103.

In step S103, the estimated vehicle speed VSO is read out from the memory area 54-1, as the present estimated vehicle speed VSO(i,j), e.g., VSO(1,1). Further, the last final vehicle speed VFNL(i-1) which is initially reset to "0" is read out from the memory area 54-6, as VFNL(i-1, jmax), e.g., VFNL(0,jmax), and the cumulative error ERR which is also initially reset to "0" is read out from the memory area 54-7. Then, the difference VSO(i,j)−VFNL(i−1,jmax) is calculated, and the read-out cumulative error ERR is added to the calculated difference to thereby update the cumulative error ERR, that is, to obtain the currently effective cumulative error ERR. The updated ERR is stored in the memory area 54-7.

The control flow then goes to step S104 to determine whether the count CC which is incremented at the time interval $\alpha$ (cycle time of the routine) and stored in the memory area 54-10 is equal to or larger than a threshold $CC_0$ which corresponds to the time period $\beta$ (ms) as indicated in FIG. 6. In the first cycle of execution of the routine, a negative decision (NO) is obtained in step S104, and the control flow returns to step S101. Thus, one cycle of execution of the routine is completed.

When the time period $\beta$ has passed as a result of repeated implementation of steps S101-S104, an affirmative decision (YES) is obtained in step S104, and the control flow goes to step S105 to read out the cumulative error ERR from the memory area 54-7, and calculate an average by dividing the error ERR by jmax. Further, the estimated vehicle speed values VSO stored in the memory area 54-1 are read out, and an average of these values VSO is calculated by dividing the sum of the values VSO by jmax. Then, the adjusting value $\Delta K(i+i)$, e.g., $\Delta K(2)$ to be used in step S31 in the next cycle of execution of the routine is obtained as a quotient calculated by dividing the average cumulative error ERR by the calculated average of the estimated vehicle speed values VSO. Further, the cumulative error ERR stored in the memory area 54-7 and the count CC stored in the memory area 54-10 are reset to "0", for the next implementation of steps S103 and S104.

Step S105 is adapted to reset the adjusting value $\Delta K(i+i)$ to "0" immediately after it is found that the average of the estimated vehicle speed values VSO is substantially zero.

Then, the control flow goes to steps S106 through S109 to determine whether the vehicle is running in the steady state or in the transient state. More specifically described, step S106 is implemented to determine whether the brake switch is on, and step S107 is implemented to determine whether the absolute value of the vehicle acceleration or deceleration value (rate of change in the value VSO) is equal to or larger than a predetermined threshold value $G_0$. Step S108 is then implemented to determine whether the average of the estimated vehicle speed values VSO is equal to or lower than a predetermined lower limit A, and step S109 is implemented to determine whether the above average is equal to or higher than a predetermined upper limit B. If a negative decision (NO) is obtained in all of the above four steps S106–S109, this means that the vehicle is running in the steady state. In this case, the control flow goes to step S110 in which the adjusting value $\Delta K(i+1)$ is added to the presently effective compensating coefficient K(i) to obtain the next compensating coefficient K(i+1). The obtained coefficient K(i+1) is stored in the memory area 54-8 of the RAM 54.

If an affirmative decision (YES) is obtained in any one of the above four steps S106–S109, this indicates that the vehicle is running in the transient state. In this case, the control flow goes to step S111 in which the currently effective compensating coefficient K(i) is determined as the next compensating coefficient K(i+1). Thus, the compensating coefficient K stored in the memory area 54-8 remains unchanged.

It will be understood from the above explanation that the compensating coefficient K is updated each time the affirmative decision (YES) is obtained in step S104 while the vehicle is running in the steady state, with the provisional vehicle speed VPRV (estimated speed VSO) slowing changing or held substantially constant.

Figure 7:
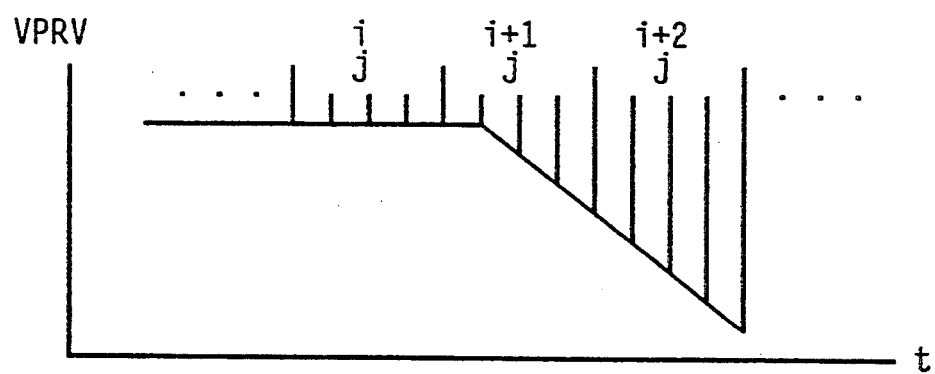
FIGS. 7 and 8 are graphs indicating the ! provisional vehicle speed varying with time, for explaining routine of FIG. 3.

The graph of FIG. 7 shows an example of a change in the provisional vehicle speed VPRV, wherein the vehicle first runs in a steady state at a substantially constant speed during a first period indicated at "i", and then runs in a transient state with a rapid drop of the speed during the following second and third periods indicated at "i+1" and "i+2". These periods correspond to the time interval $\beta$. In the first or "i"-th period which starts with the affirmative decision (YES) in step S104, step S110 is implemented to update the compensating coefficient K. In the second "i+1"-th period which also starts with the affirmative decision in step S104, step S111 rather than S110 is implemented, whereby the compensating coefficient K(i+1) used in the second period is used as K(i+2) in the third or "i+2"-th period. It is noted that step S111 is implemented in the second or "i+1"-th period even if the provisional vehicle speed VPRV starts to drop in an early portion of the "i+1"-th period as in the example of FIG. 7, because the step S108 to detect the excessive drop of the vehicle speed for example is implemented in a relatively terminal part of the steady state checking portion (S106–S109) of the routine.

Figure 8:
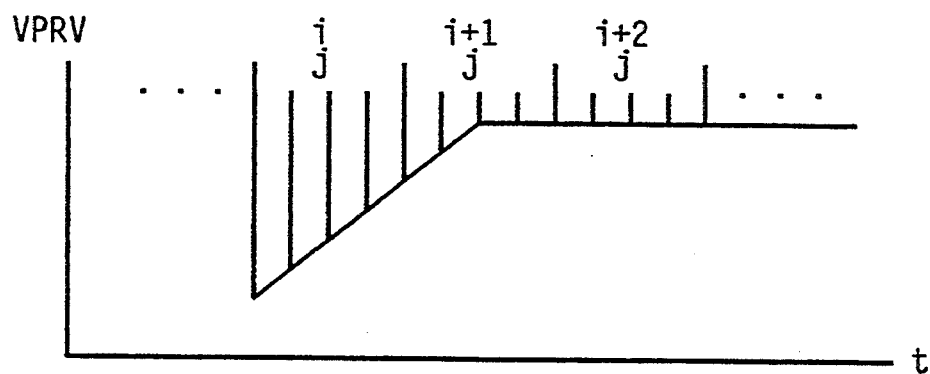

The graph of FIG. 8 shows another example of the vehicle running condition in which the vehicle is in the transient running state in the first or "i"-th period, and is returned to the steady running state in the following "i+1"-th and "i+2"-th periods. In this case, the updating of the compensating coefficient K is inhibited with step S111 implemented during the "i"-th and "i+1"-th periods, but the coefficient K is updated in step S110 in the "i+2"-th period. Since the vehicle is in the transient state in an early part of the "i+1"-th period, all the estimated vehicle speed values VSO used in step S105 to calculate the adjusting value aK(i+2) used for the "i+2"-th period are not the values VSO obtained in the steady running state. However, an error due to this partial dependence on the values VSO in the transient running state is not considerable and is negligible in practice.

While the operation of the present embodiment when the output level of the receiver 12 is in the high range has been described above, the routine of FIG. 3 is adapted such that a negative decision (NO) is obtained in step S102, when the output level of the receiver 12 is excessively low with the vehicle running on a relatively smooth road surface. In this case, step S112 is implemented to reset the cumulative error ERR and the count CC, and step S111 is implemented to maintain the presently effective compensating coefficient K(i) stored in the memory area 54-8, that is, use the present value K(i) as the next compensating coefficient K(i+1). The control then returns to step S101.

Figure 9:
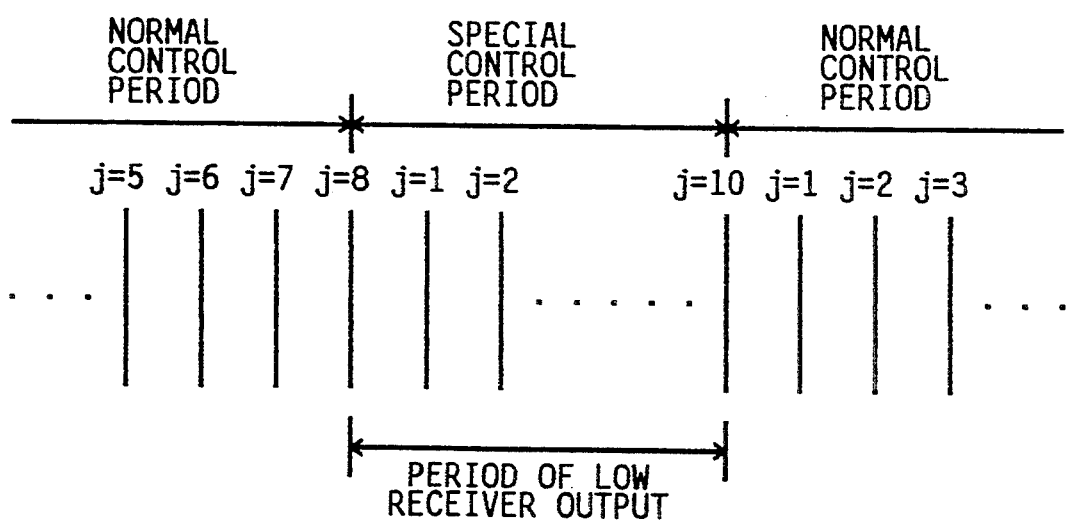
FIG. 9 is a view indicating normal and special controls which are effected when the output level of the receiver of the detecting apparatus of FIG. 1 is higher and lower than a threshold, respectively.

Thus, while the output level of the receiver 12 is lower than a threshold determined by the first reference voltage Vref1 described above, the computer of the controller 50 effects a special control in which the updating of the compensating coefficient K is inhibited, with steps S103–S110 being skipped, and step S112 is implemented to clear the memory areas 54-7 and 54-10 of the RAM 54. The special control is replaced by the normal control when the output level of the receiver 12 returns to the normal level, as indicated in FIG. 9. During the special control period, the compensating coefficient K stored in the memory area 54-8 is not updated, that is, the compensating coefficient K(i−1) used in the preceding normal control period is used as the effective coefficient (i). Thus, the constant coefficient K(i) is used to compensate the provisional vehicle speed values VPRV(i) to obtain the final vehicle speed values VFNL(i) in the special control period.

It will be understood that the receiver-output detecting circuit 30 cooperates with a portion of the controller 50 assigned to execute the routine of FIG. 2 to provide receiver-output detecting means for detecting the output level of the receiver 12, and that the signal processing circuit and the wheel speed sensors 60 cooperate with a portion of the controller 50 assigned to execute the routines of FIGS. 2 and 3 to constitute means for determining the final vehicle speed as the ground speed of the vehicle.

Figure 10:
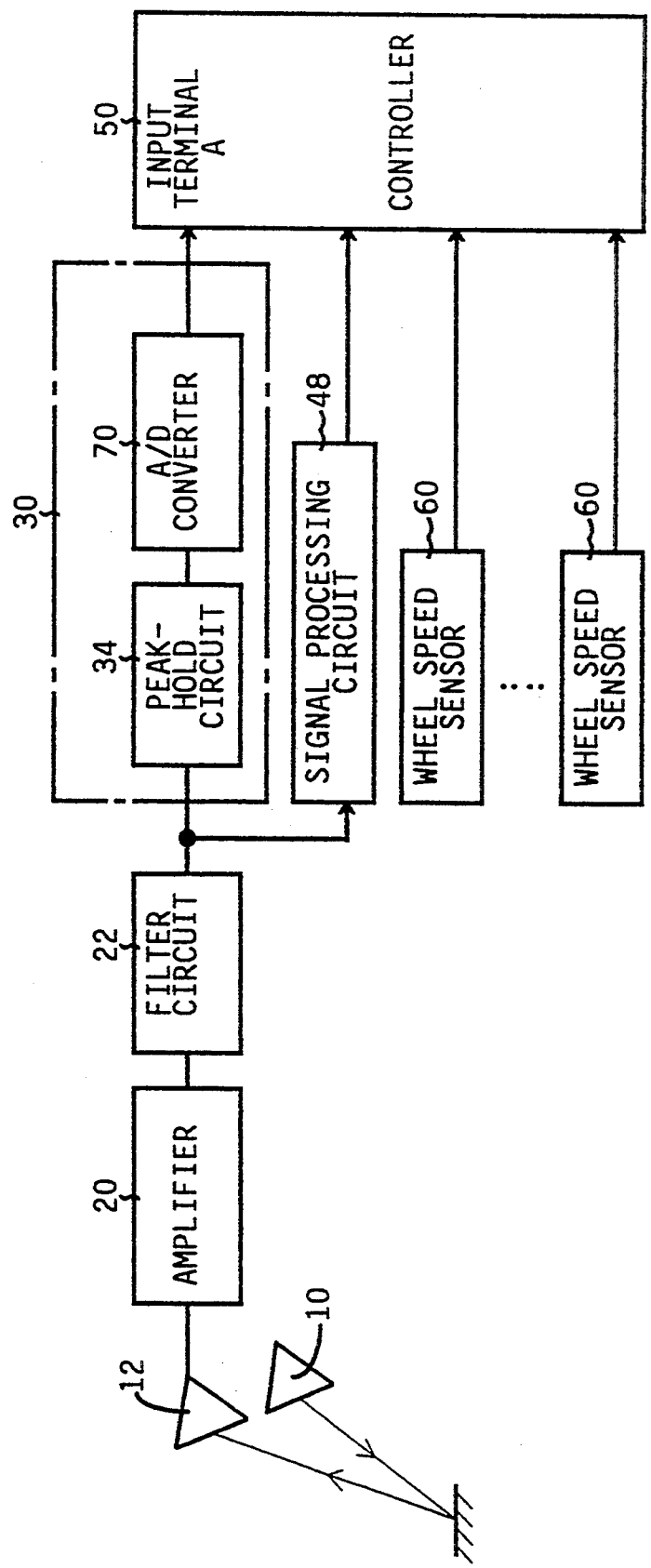
FIG. 10 is a schematic block diagram illustrating another embodiment of the Doppler-effect vehicle-speed detecting apparatus of the present invention.
Figure 11:
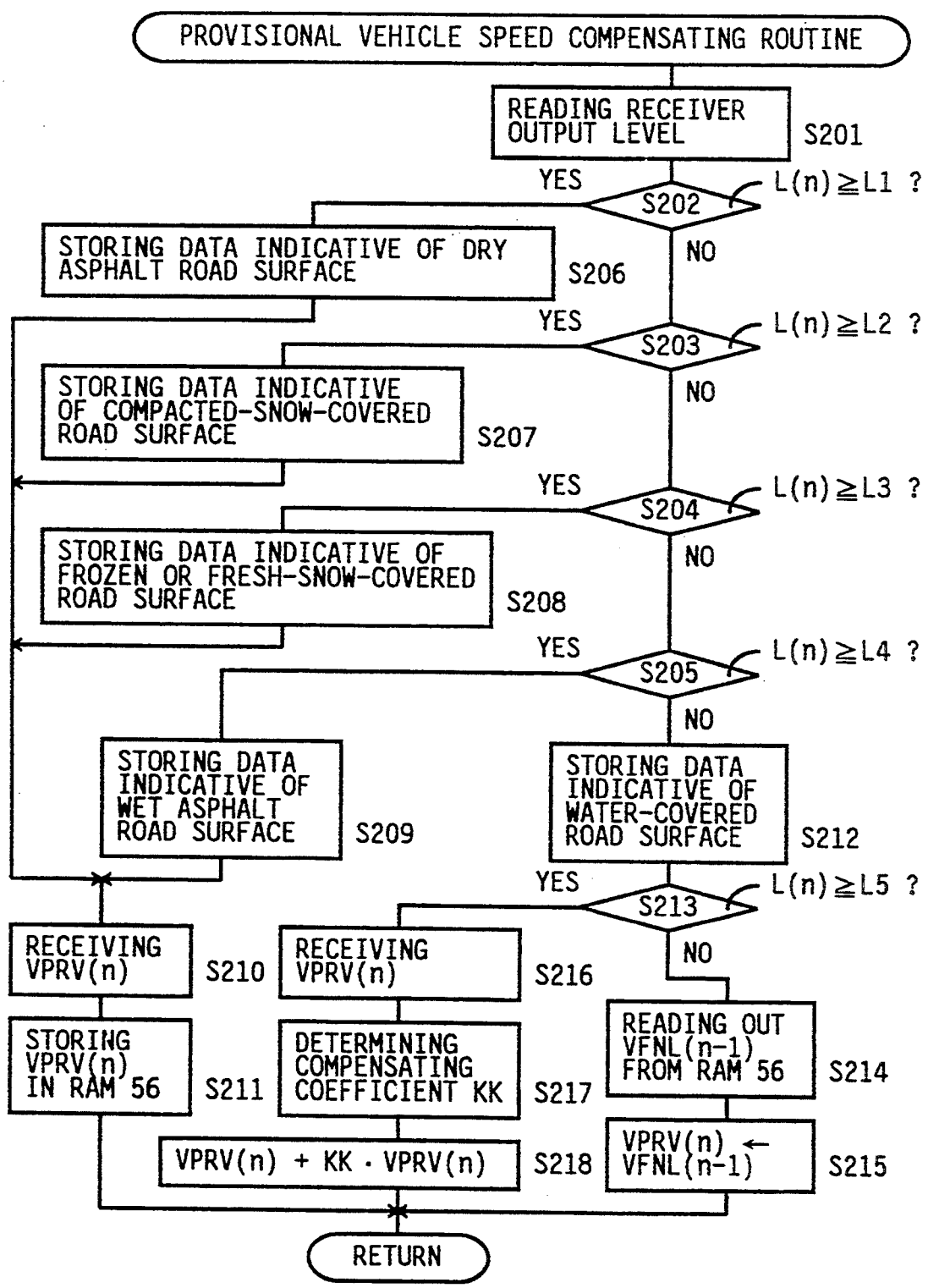
FIG. 11 is a flow chart illustrating a routine executed by a computer of a controller shown in FIG. 10, for estimating the road surface condition and compensating the provisional vehicle speed.

Referring to FIGS. 10–12, there will be described another embodiment of this invention.

The present second embodiment is identical with the first embodiment, except that an A/D converter 70 is used in place of the discriminating circuit 44. The output signal of the peak-hold circuit 34 which is the peal value of the voltage output signal of the filter circuit 22 is converted by the A/D converter 70 into a digital signal indicative of the output level of the receiver 12.

Further, the read-only memory of the computer of the controller 50 stores the same estimated vehicle speed calculating routine and final vehicle speed calculating routine as used in the first embodiment, and a provisional vehicle speed calculating routine which is illustrated in the flow chart of FIG. 11 and is different from that illustrated in FIG. 3. The computer of the controller 50 uses a random-access memory (RAM) indicated generally at 56 in FIG. 12. The RAM 56 has various memory areas including: a memory area 56-1 for storing the estimated vehicle speed VSO as described above; a memory area 56-2 for storing the provisional vehicle speed VPRV as described above; a memory area 56-3 for storing the present final vehicle speed VFNL(n) as described above; a memory area 56-4 for storing the last final vehicle speed VFNL(n−1) as described above; a memory area 56-5 for storing the output level L of the receiver 12 as represented by the digital output signal of the A/D converter 70; a memory area 56-6 for storing data indicative of the condition of the road surface on which the vehicle is running; a memory area 56-7 for storing the compensating coefficient KK determined in the provisional vehicle speed compensating routine of FIG. 11; and a memory area 56-7 for storing the cumulative error ERR as described above.

The provisional vehicle speed compensating routine of FIG. 11 is adapted such that the condition of the road surface on which the vehicle is running is estimated or guessed on the basis of the output signal received from the A/D convertor 70, so that the provisional vehicle speed VPRV calculated by the signal processing circuit 48 is compensated depending upon the estimated road surface condition. In the first embodiment of FIGS. 1-9, the effective provisional vehicle speed VPRV is determined in three different ways corresponding to the high, medium and low ranges of the output level of the receiver 12. In the present second embodiment, too, the effective provisional vehicle speed VPRV is determined in three different ways depending upon the output level of the receiver 12. However, the condition of the road surface condition is estimated by comparing the detected output level of the receiver 12 (level of the digital output of the A/D converter 70) with five threshold values. This comparison permits the estimation of the road surface condition, because the relationship between the output level of the receiver 12 and the road surface condition is empirically known. It is noted that specific forms of the road surface condition correspond to different ranges of friction coefficient of the road surface.

The provisional vehicle speed compensating routine according to the second embodiment will be described in detail by reference to the flow chart of FIG, 11.

Initially, step S201 is implemented to read the output level L(n) of the receiver 12 currently stored in the memory area 56-5 of the RAM 56. The output level L(n) is stored in the memory area 56-5 according to a suitable control program, on the basis of the digital output signal of the A/D converter 70. This control program includes steps for smoothing the digital output signal of the converter 70, so that noises are eliminated from the output level L(n) stored in the RAM 56.

Step S201 is followed by step S202 to compare the output level L(n) with a first threshold value $L_1$. If the output level L(n) is equal to or higher than the threshold value $L_1$, the control flow goes to step S206 to determine that the present road surface condition is that of a dry asphalt road surface. Data indicative of this nature of the road surface are stored in the memory area 56-6 of the RAM 56. In this case, steps S203–S209 are skipped, and step S210 is implemented.

If the output level L(n) is lower than the first threshold value $L_1$, step S203 is implemented to compare the output level L(n) with a second threshold value $L_2$ smaller than $L_1$. If the output level L(n) is equal to or higher than the threshold value $L_2$, the control flow goes to step S207 to determine that the present road surface condition is that of a compacted-snow-covered road surface, and store data indicative of this nature of the road surface in the memory area 56-6. Step S207 is followed by step S210. If the output level L(n) is lower than the second threshold level $L_2$, step S204 is implemented to compare the output level L(n) with a third threshold level $L_1$ smaller than $L_2$. If the output level L(n) is equal to or higher than the threshold value $L_3$, the control flow goes to step S208 to determine that the present road surface is a frozen or fresh-snow-covered road surface, and store data indicative of this determination in the memory area 56-6. In this case, too, step S210 is implemented following step S208.

If the output level L(n) is lower than the third threshold value $L_3$, step S205 is implemented to compare the output level L(n) with a fourth threshold valve $L_4$ smaller than $L_3$. If the output level L(n) is equal to or higher than the fourth threshold value $L_4$, step S209 is implemented to determine that the present road surface is a wet asphalt road surface, and store data indicative of this determination in the memory area 56-6. Step S209 is followed by step S210. If the output level L(n) is lower than the fourth threshold value $L_4$, step S212 is implemented to determine that the present road surface condition is that of a water-covered or submerged road surface, and store data indicative of this determination in the memory area 56-6. Step S212 is followed by step S213 to compare the output level L(n) with a fifth threshold value $L_5$ smaller than $L_4$. If the output level L(n) is equal to or higher than the threshold value $L_s$, step S216 is implemented. If the output level L(n) is lower than the threshold value $L_5$, step S214 is implemented.

It will be understood that steps S202 through S205 and step S213 are provided to classify the output level L(n) into six ranges which correspond: four cases in which the affirmative decision (YES) is obtained in steps S202, S203, S204 and S205; one case in which the negative decision (NO) is obtained in step S213; and one case in which the affirmative decision (YES) is obtained in step S213.

The first four cases are considered to correspond to step S10 of FIG. 2 in which the output level of the receiver 12 is determined to be in the high range. In this case, step S210 is implemented to receive the provisional vehicle speed VPRV(n) from the signal processing circuit 48, and then step S211 is implemented to store the received speed VPRV(n) in the memory area 56-2 of the RAM 56.

The fifth case in which the negative decision (NO) is obtained in step S213 is considered to correspond to step S3 of FIG. 2 in which the output level of the receiver 12 is determined to be in the low range. In this case, step S214 is implemented to read out the last final vehicle speed VFNL(n−1) from the memory area 56-4 of the RAM 56, and step S215 is implemented to store the last final vehicle speed VFNL(n−1) in the memory area 56-2 as the effective provisional vehicle speed VPRV(n).

The sixth case in which the affirmative decision (YES) is obtained in step S213 is considered to correspond to step S6 of FIG. 2 in which the output level of the receiver 12 is determined to be in the medium range. In this case, step S216 is implemented to receive the provisional vehicle speed VPRV(n) from the signal processing circuit 48, and then step S217 is implemented to determine the compensating coefficient KK. This coefficient KK is determined in the same manner as described with respect to step S8 of the first embodiment, namely, according to a suitable relationship between VPRV and KK, as indicated in the graph of FIG. 5. The relationship is represented by a data map stored in the read-only memory of the controller 50. Step S217 is followed by step S218 in which a product of the value VPRV(n) and the coefficient KK is added to the value VPRV(n), to compensate the provisional vehicle speed VPRV as received from the circuit 48, namely, to obtain a compensated vehicle speed Vcom, namely, to determine the effective provisional vehicle speed VPRV(n) to be stored in the memory area 56-2.

Successively, the final vehicle speed calculating routine is executed as described with respect to the first embodiment.

In the present embodiment, the threshold values $L_1$ through $L_5$ are set as follows, for example:

$L_1 = 80$ dB
$L_2 = 70$ dB $L_3 = 65$ dB
$L_4 = 40$ dB
$L_5 = 30$ dB

However, these threshold values may be suitably selected depending upon the sensitivity of the receiver 12, mounting conditions of the transmitter and receiver 10, 12 and other parameters of the Doppler-effect vehicle-speed detecting apparatus.

It will be understood from the above description that the second embodiment is capable of estimating the friction coefficient of the road surface in the form of different road surface conditions that are estimated by comparing the detected output level L(n) of the receiver 12 with the five threshold values, as well as determining the effective provisional vehicle speed VPRV in different ways depending upon the detected output level L(n). The condition or friction coefficient of the road surface can be estimated from the detected output level L(n), since the actual road surface condition and the actual output level L(n) of the receiver 12 has a known relationship, that is, the relationship between these parameters is known by experiments. The estimated road surface condition or friction coefficient, as well as the detected vehicle ground speed, can be utilized for controlling the slip ratio of the wheels of the vehicle. The apparatus according to the second embodiment capable of estimating the road surface condition and determining the final vehicle speed VFNL is small-sized and economical to manufacture, as compared with a combination of two devices adapted to perform the above-indicated two functions independently of each other.

In the second embodiment, the portion of the controller 50 assigned to execute the routine of FIG. 11 constitutes a part of the means for determining the final vehicle speed on the basis of the provisional vehicle speed calculated from the output signal of the receiver 12.

In the illustrated embodiments, the transmitter and receiver 10, 12 are attached to the vehicle body such that the boresights or axes of the transmitter and receiver are inclined in the backward or reverse running direction of the vehicle. When the output level of the receiver 12 is in the medium range, the effective provisional vehicle speed VPRV(i) stored in the RAM 54, 56 and used in the routine of FIG. 3 to calculate the final vehicle speed VFNL is obtained by adding (KK·VPRV) to the original provisional vehicle speed VPRV as received from the circuit 48. However, the effective provisional vehicle speed when the receiver output level is in the medium range is obtained by subtracting (KK·VPRV) from the original provisional vehicle speed, if the axes of the transmitter and receiver 10, 12 are inclined in the forward running direction of the vehicle.

In the illustrated embodiments, the provisional vehicle speed VPRV(i) is used as a parameter which reflects or approximates the actual vehicle speed and which is multiplied by the compensating coefficient KK in step S9 or 10 S218, this parameter VPRV(i) may be replaced by the estimated vehicle speed VSO calculated from the wheel speeds detected by the wheel speed sensors 60, since the estimated vehicle speed VSO also reflects or approximates the actual vehicle speed.

While the present invention has been described above in its presently preferred embodiments, for illustrative purpose only, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. A Doppler-effect speed detecting apparatus for detecting a ground speed of a motor vehicle, comprising:
    a transmitter for transmitting a wave toward a road surface;
    a receiver for receiving a portion of the transmitted wave which is reflected by the road surface;
    receiver-output detecting means for detecting an output level of said receiver; and
    ground-speed determining means for determining the ground speed of the vehicle owing to a Doppler effect, on the basis of a frequency of said transmitted wave and a frequency of said reflected portion of the transmitted wave, according to a predetermined first rule when said output level of said receiver is higher than a predetermined threshold value, and according to a predetermined second rule different from said first rule when said output level is not higher than said threshold value.

2. A Doppler-effect speed detecting apparatus according to claim 1, wherein said output-level detecting means includes peak-hold means for holding a peak value of an output signal of said receiver, and output-level determining means for determining said output level of said receiver on the basis of said peak value of said output signal of said receiver.

3. A Doppler-effect speed detecting apparatus according to claim 2, wherein said output-level determining means comprises comparing means for comparing said peak value of said output signal of said receiver with at least one threshold value, and classifying said peak value in a plurality of ranges defined by said at least one threshold value, the number of said plurality of ranges being larger by one than the number of said at least one threshold value.

4. A Doppler-effect speed detecting apparatus according to claim 3, wherein said at least one threshold value consists of two threshold values, and said output-level determining means classifies said peak value in one of a high range, a medium range and a low range which are defined by said two threshold values, and wherein said ground-speed determining means determines said ground speed of the vehicle according to said predetermined first rule when said peak value of said output signal of said receiver is in said high range, and according to said predetermined second rule when said peak value is in said medium range, said ground-speed determining means maintaining, when said peak value is in said low range, the ground speed determined immediately before said peak value has been lowered to fall in said low range.

5. A Doppler-effect speed detecting apparatus according to claim 1, wherein said predetermined second rule consists of a rule for calculating a compensated vehicle speed Vcom as said ground speed, according to the following equation:

$$Vcom = Vprv + KK \cdot Va$$

where,
   Vprv = ground speed as determined according to said predetermined first rule;
   KK = compensating coefficient; and Va=parameter approximating an actual ground speed of the vehicle.

6. A Doppler-effect speed detecting apparatus according to claim 5, wherein said parameter Va consists of said ground speed Vprv as determined according to said predetermined first rule.

7. A Doppler-effect speed detecting apparatus according to claim 5, wherein said parameter Va consists of an estimated vehicle speed obtained on the basis of rotating speeds of a plurality of wheels of the vehicle.

8. A Doppler-effect speed detecting apparatus according to claim 7, wherein said estimated vehicle speed is obtained as an intermediate one of three values consisting of: a highest one of the rotating speeds of said wheels; a maximum wheel speed calculated on the basis of the last estimated vehicle speed and a minimum wheel speed calculated on the basis of the last estimated vehicle speed.

9. A Doppler-effect speed detecting apparatus according to claim 1, further comprising road-surface condition estimating means for estimating a condition of said road surface on the basis of said output level of said receiver detected by said receiver-output detecting means.

10. A Doppler-effect speed detecting apparatus according to claim 9, wherein said road-surface condition estimating means estimates a friction coefficient of said road surface as said condition of the road surface.

11. A Doppler-effect speed detecting apparatus according to claim 9, wherein said road-surface condition estimating means estimates the condition of said road surface such that said road surface is classified as one of a plurality of different road surface conditions including: a dry asphalt road surface; a road surface covered by compacted snow; a frozen road surface; a road surface covered by fresh snow; a wet asphalt road surface; and a road surface covered by water.

12. A Doppler-effect speed detecting apparatus according to claim 1, further comprising:
relationship obtaining means for obtaining a relationship between said estimated vehicle speed and said ground speed determined by said ground-speed determining means, when the vehicle is in a steady running state in which said estimated vehicle speed accurately represents said ground speed of the vehicle; and
compensating means for adjusting said ground speed as determined by said ground-speed determining means, on the basis of said relationship obtained by said relationship obtaining means, when the vehicle is in a transient running state in which said estimated vehicle speed does not accurately represents said ground speed of the vehicle.

13. A Doppler-effect speed detecting apparatus according to claim 12, wherein said compensating means adjusts said ground speed in said transient running state of the vehicle, on the basis of said relationship which was obtained by said relationship obtaining means in the steady running state of the vehicle which immediately precedes said transient running state.

14. A Doppler-effect speed detecting apparatus according to claim 12, wherein said relationship obtaining means obtains as said relationship a ratio of said estimated vehicle speed to said ground speed as determined by said ground-speed determining means, when said vehicle in said steady running state, and said compensating means adjusts, when the vehicle is in said transient running state, said ground speed by multiplying said ground speed by said ratio.

15. A Doppler-effect speed detecting apparatus according to claim 12, wherein said relationship obtaining means determines that the vehicle is in said steady running condition, when at least the following two conditions (i) and (ii) are satisfied:
(i) an absolute value of acceleration of said vehicle is smaller than a predetermined value; and
(ii) said estimated vehicle speed is within a range defined by a predetermined upper limit and a predetermined lower limit.

16. A Doppler-effect speed detecting apparatus for detecting a ground speed of a motor vehicle, comprising:
a transmitter for transmitting a wave toward a road surface;
a receiver for receiving a portion of the transmitted wave which is reflected by the road surface;
ground-speed determining means for determining the ground speed of the vehicle owing to a Doppler effect, on the basis of a frequency of said transmitted wave and a frequency of said reflected portion of the transmitted wave;
receiver-output detecting means for detecting an output level of said receiver; and
road-surface condition estimating means for estimating a condition of said road surface on the basis of said output level of said receiver detected by said receiver-output detecting means.

17. A Doppler-effect speed detecting apparatus according to claim 16, wherein said road-surface condition estimating means estimates a friction coefficient of said road surface as said condition of the road surface.

18. A Doppler-effect speed detecting apparatus according to claim 16, wherein said road-surface condition estimating means estimates the condition of said road surface such that said road surface is classified as one of a plurality of different road surface conditions including: a dry asphalt road surface; a road surface covered by compacted snow; a frozen road surface; a road surface covered by fresh snow; a wet asphalt road surface; and a road surface covered by water.

19. A Doppler-effect speed detecting apparatus for detecting a ground speed of a motor vehicle, comprising:
a transmitter for transmitting a wave toward a road surface;
a receiver for receiving a portion of the transmitted wave which is reflected by the road surface;
said transmitter and said receiver being attached to a body of the motor vehicle such that axes of the transmitter and receiver are inclined in a backward running direction of the vehicle relative to said road surface;
receiver-output detecting means for detecting an output level of said receiver;
ground-speed determining means for determining the ground speed of the vehicle owing to a Doppler effect, on the basis of a frequency of said transmitted wave and a frequency of said reflected portion of the transmitted wave, according to a predetermined first rule when said output level of said receiver is higher than a predetermined threshold value, and according to a predetermined second rule different from said first rule when said output level is not higher than said threshold value; and said ground-speed determining means calculating a compensated ground speed, according to said predetermined second rule by increasing the ground speed as calculated according to said predetermined first rule, by an amount proportional to a parameter which reflects said ground speed.

20. A Doppler-effect speed detecting apparatus for detecting a ground speed of a motor vehicle, comprising:

a transmitter for transmitting a wave toward a road surface;

a receiver for receiving a portion of the transmitted wave which is reflected by the road surface;

said transmitter and said receiver being attached to a body of the motor vehicle such that axes of the transmitter and receiver are inclined in a forward running direction of the vehicle relative to said road surface;

receiver-output detecting means for detecting an output level of said receiver;

ground-speed determining means for determining the ground speed of the vehicle owing to a Doppler effect, on the basis of a frequency of said transmitted wave and a frequency of said reflected portion of the transmitted wave, according to a predetermined first rule when said output level of said receiver is higher than a predetermined threshold value, and according to a predetermined second rule different from said first rule when said output level is not higher than said threshold value; and said ground-speed determining means calculating a compensated ground speed, according to said predetermined second rule by decreasing the ground speed as calculated according to said predetermined first rule, by an amount proportional to a parameter which reflects said ground speed.

21. A Doppler-effect speed detecting apparatus for detecting a ground speed of a motor vehicle, comprising:

a transmitter for transmitting a wave toward a road surface;

a receiver for receiving a portion of the transmitted wave which is reflected by the road surface;

said transmitter and said receiver being attached to a body of the motor vehicle such that axes of the transmitter and receiver are inclined in a backward running direction of the vehicle relative to said road surface;

road-surface condition estimating means for classifying said road surface as one of a plurality of different road surface conditions including a first condition and a second condition, said first condition causing said transmitted wave to be reflected to a smaller extent than said second condition;

ground-speed determining means for determining the ground speed of the vehicle owing to a Doppler effect, on the basis of a frequency of said transmitted wave and a frequency of said reflected portion of the transmitted wave, according to a first predetermined rule when said road-surface condition estimating means has classified said road surface as said first condition, and according to a second predetermined rule different from said first predetermined rule when said road-surface condition estimating means classified said road surface as said second condition; and said ground-speed determining means calculating a compensated ground speed, according to said predetermined second rule by increasing the ground speed as calculated according to said predetermined first rule, by an amount proportional to a parameter which reflects said ground speed.

22. A Doppler-effect speed detecting apparatus for detecting a ground speed of a motor vehicle, comprising:

a transmitter for transmitting a wave toward a road surface;

a receiver for receiving a portion of the transmitted wave which is reflected by the road surface;

said transmitter and said receiver being attached to a body of the motor vehicle such that axes of the transmitter and receiver are inclined in a forward running direction of the vehicle relative to said road surface;

road-surface condition estimating means for classifying said road surface as one of a plurality of different road surface conditions including a first condition and a second condition, said first condition causing said transmitted wave to be reflected to a smaller extent than said second condition;

ground-speed determining means for determining the ground speed of the vehicle owing to a Doppler effect, on the basis of a frequency of said transmitted wave and a frequency of said reflected portion of the transmitted wave, according to a first predetermined rule when said road-surface condition estimating means has classified said road surface as said first condition, and according to a second predetermined rule different from said first predetermined rule when said road-surface condition estimating means classified said road surface as said second condition; and said ground-speed determining means calculating a compensated ground speed, according to said predetermined second rule by decreasing the ground speed as calculated according to said predetermined first rule, by an amount proportional to a parameter which reflects said ground speed.

23. A Doppler-effect speed detecting apparatus according to claim 1, wherein said receiver-output detecting means comprises peak-hold means for holding a peak value of an output signal of said receiver, smoothing means for smoothing an output signal of said peak-hold means, and output-level determining means for said output level of said receiver on the basis of the smoothed output signal of said peak-hold means.

* * * * *